United States Patent [19]
Gill

[11] Patent Number: 5,793,576
[45] Date of Patent: Aug. 11, 1998

[54] DISK DRIVE WITH A THERMAL ASPERITY REDUCTION CIRCUITRY USING A MAGNETORESIS SENSOR

[75] Inventor: Hardayal Singh Gill, Portola Valley, Calif.

[73] Assignee: International Business Machines Corporation, Armonk, N.Y.

[21] Appl. No.: 869,732

[22] Filed: Jun. 5, 1997

Related U.S. Application Data

[62] Division of Ser. No. 729,218, Oct. 9, 1996.
[51] Int. Cl.$^6$ .................................................. G11B 5/39
[52] U.S. Cl. ................................................................ 360/113
[58] Field of Search ........................... 360/113; 338/42 R; 324/252

[56] References Cited

U.S. PATENT DOCUMENTS

| | | | |
|---|---|---|---|
| 5,233,482 | 8/1993 | Galbraith et al. | 360/46 |
| 5,420,736 | 5/1995 | Heim et al. | 360/113 |
| 5,452,163 | 9/1995 | Coffey et al. | 360/113 |
| 5,556,718 | 9/1996 | Motomura et al. | 361/113 |

*Primary Examiner*—Robert S. Tupper
*Attorney, Agent, or Firm*—Paik Saber

[57] ABSTRACT

A disk drive system having a magnetoresistive (MR) sensor having four leads, two leads for providing sense current to an MR layer and two leads for providing current to a soft adjacent layer (SAL). The MR layer as well as the hard bias layers are electrically insulated from the SAL by an insulator. The voltages developed across the MR layer (voltages due to the presence of thermal asperities and voltages due to the presence of data fields) and the SAL (voltages due to the presence of thermal asperities) are applied to the inputs of a differential amplifier for substantial elimination of the thermal asperity signal.

15 Claims, 6 Drawing Sheets

DISK DRIVE WITH A THERMAL ASPERITY REDUCTION CIRCUITRY USING A MAGNETORESIS SENSOR

This is a division of U.S. patent application Ser. No. 08/729,218 filed Oct. 9, 1996.

BACKGROUND OF THE INVENTION

1. Technical Field

This invention relates in general to a direct access storage device (DASD) of the type utilizing magnetoresistive (MR) read sensors for reading signals recorded in a magnetic medium and, more particularly, it relates to a DASD having a novel MR sensor for minimizing the effect of thermal asperities.

2. Description of the Background Art

Computers often include auxiliary memory storage devices having media on which data can be written and from which data can be read for later use. A direct access storage device (disk drive) incorporating rotating magnetic disks are commonly used for storing data in magnetic form on the disk surfaces. Data is recorded on concentric, radially spaced information tracks on the disk surfaces. Magnetic heads including read sensors are then used to read data from the tracks on the disk surfaces.

In high capacity disk drives, magnetoresistive read sensors, commonly referred to as MR heads, are the prevailing read sensor because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

The most common MR sensors currently under utilization in the high capacity disk drives are anisotropic magnetoresistive (AMR) sensors manifesting the AMR effect. In the AMR sensor, the electron scattering and therefore the resistance of the MR layer varies as the function of $\cos^2 \alpha$ where $\alpha$ is the angle between the magnetization of the MR layer and the direction of the current flowing in the MR layer (FIG. 1). The electron scattering and therefore the resistance is highest for the case where the magnetization of the MR layer is parallel to the current and minimum when the magnetization of the MR layer is perpendicular to the current. U.S. Pat. No. 5,018,037 entitled "Magnetoresistive Read Transducer Having Hard Magnetic Bias", granted to Krounbi et al. on May 21, 1991, discloses an MR sensor operating on the basis of the AMR effect.

Referring back to FIG. 1, there is shown a prior art AMR sensor 100 comprising end regions 104 and 106 separated by a central region 102. MR layer 110 is separated from a soft adjacent layer (SAL) 120 by a non-magnetic, electrically conducting spacer 115 and all three layers are formed in the central region 102. Hard bias layers 130 and 135 formed in the end regions 104 and 106, respectively, provide longitudinal bias for the MR layer 110 and the SAL 120. Leads 140 and 145 formed over hard bias layers 130 and 135, respectively, provide electrical connections for the flow of the sensing current $I_S$ from a current source (not shown) to the MR sensor 100.

As mentioned earlier, an MR sensor exhibits a change in resistance when in the presence of a changing magnetic field. This resistance change is transformed into a voltage signal by passing a constant sense current through the MR element. The value of the DC voltage for a given MR sensor, is the product of the constant sense current and the total resistance between the MR sensor leads. Since the change in the resistance is the principal upon which the MR sensor operates, the change in resistance can substantially effect the performance of the MR sensor and the disk drive incorporating the MR sensor.

A phenomena, known as thermal asperity (TA), can suddenly increase the MR sensor temperature by more than 100 degrees C. The cause of this sudden temperature rise is a collision or near collision of the MR sensor with a protrusion on the disk surface while reading information from a track. The collision causes the DC base voltage of the MR sensor to shift substantially thus making the information unreadable.

FIG. 2 is a graph illustrating DC base (bias) voltage 210, thermal asperity voltage 220 which is the shift in the base DC voltage 210, and data signal 235 read back from the disk in the absence of the thermal asperity 220 and data signal 240 read back from the disk in the presence of the thermal asperity 220. Note that the thermal asperity 220 comprises a sudden shift 225 in the DC base voltage followed by an exponential decay 230 in the DC base voltage. The exponential decay 230 in the DC base voltage continues until the DC base voltage 210 is reached. It should be noted that the sudden shift 225 in the DC base voltage could be several times larger than the data signal 235 causing the electrical circuitry connected directly or indirectly to the MR sensor to saturate leading to the loss of the data. The loss of the data, depending on the size of the thermal asperity 220 could very easily be several bytes long.

Known arrangements in disk drives for minimizing the effect of thermal asperity on the read data utilize either a separate asperity reduction circuit (ARC) module which is costly or a complicated data channel (such as modified partial-response maximum likelihood channel) having a normal operating mode and an asperity recovery mode. Therefore, there is a need for an invention that minimizes the effect of thermal asperities without utilizing a complicated recording channel or a separate ARC module.

SUMMARY OF THE INVENTION

It is an object of the present invention to disclose a method and means for detecting and substantially eliminating the thermal asperity phenomena in disk drives utilizing magnetoresistive read sensors.

These and other objects and advantages are attained in accordance with the principles of the present invention by an AMR sensor having four leads, two leads (first and second MR leads, also referred to as MR leads) for providing MR sense current to the MR layer and two leads (first and second SAL leads, also referred to as SAL leads) for providing SAL current to the soft adjacent layer (SAL). The AMR sensor is further divided into end regions separated from each other by a central region. Hard bias layers formed in the end regions provide longitudinal biasing for the MR layer formed in the central region. Each hard bias layer further forms a contiguous junction with the MR layer. The SAL which provides transverse biasing for the MR layer, has its magnetization vector preferably fixed in the transverse direction (i.e., perpendicular to air bearing surface) as a result of an exchange coupling with an antiferromagnetic (AFM) layer along SAL layer's entire width and height. Furthermore, the MR layer formed in the central region as well as the hard bias layers formed in the end regions are electrically insulated from the SAL by an insulator. The MR material and the SAL material are preferably the same material to ensure matching thermal coefficient between the two layers.

Under DC condition, the product of the MR layer resistance and the current flowing in the MR layer ($R_{MR}*I_{MR}$) is chosen to be equal to the product of the SAL resistance and the current flowing in the SAL ($R_{SAL}*I_{SAL}$). The voltage developed across the MR leads is fed into the first input terminal of a differential circuit and the voltage developed across the SAL leads is fed into the second input terminal of the differential circuit. The differential circuit further has an output terminal and a ground (common) terminal.

In the presence of a thermal asperity, the resistance of both the MR and the SAL layer changes substantially equally thus causing the thermal asperity signal to be developed across the MR leads and the SAL leads and consequently fed into the first and second terminals of the differential circuit. However, in the presence of a data field from the disk, only the resistance of the MR layer changes since the MR layer is electrically insulated from the SAL and the SAL magnetization is fixed by the AFM layer. Therefore, the voltage due to the data written onto a disk would be developed only across the MR leads which in turn is fed into the first input terminal of the differential circuit.

Since the thermal asperity signal is present and common at both input terminals of the differential circuit, it will be canceled and only the data signal present at the first input terminal will be detected and propagated by the differential circuit.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

BEST MODE FOR CARRYING OUT THE INVENTION

The following description is the best mode presently contemplated for carrying out the invention. This description and the number of alternative embodiments shown are made for the purpose of illustrating the general principle of the present invention and is not meant to limit the inventive concepts claimed herein.

Figure 1:
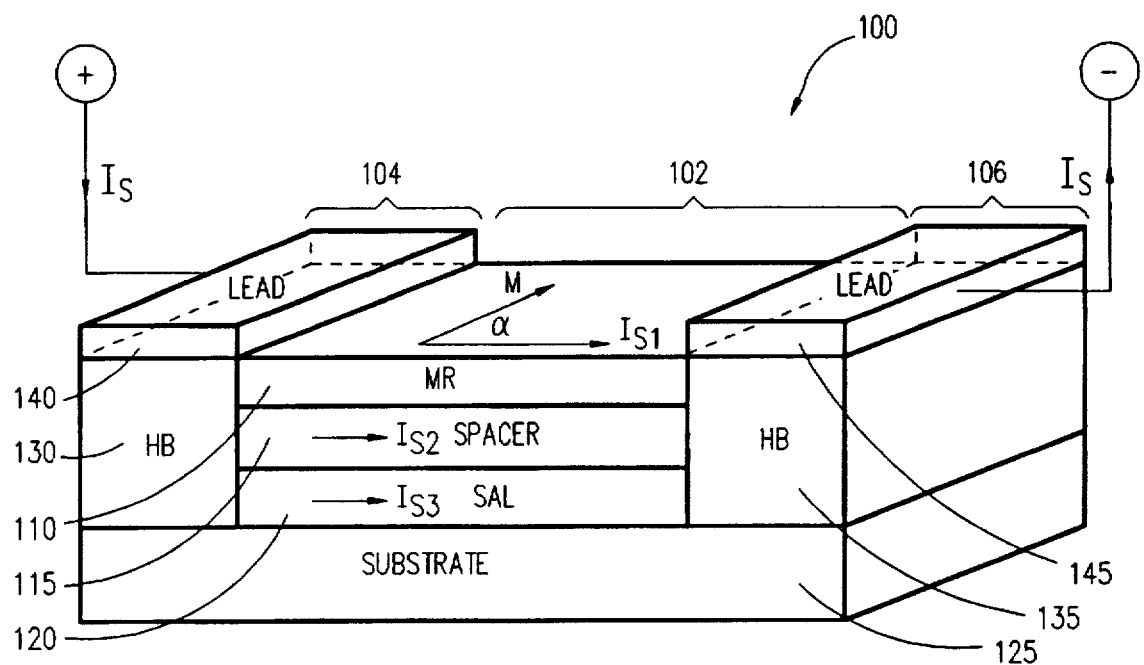
FIG. 1 is a perspective view of a prior art AMR sensor.
Figure 3:
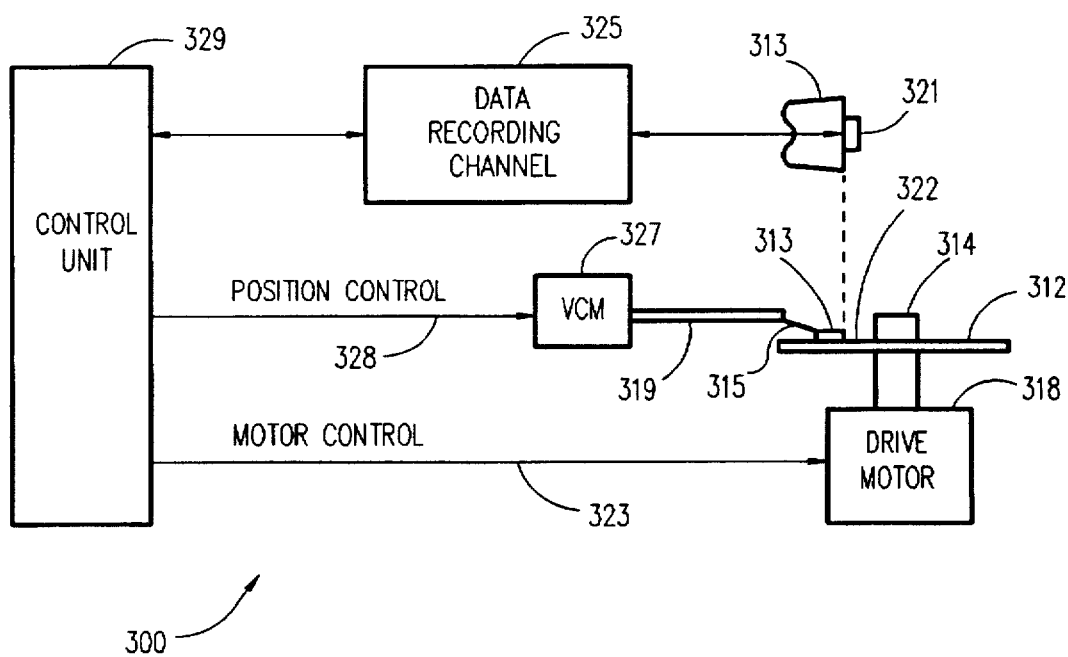
FIG. 3 is a simplified diagram of a magnetic disk storage system embodying the present invention.
Figure 2:
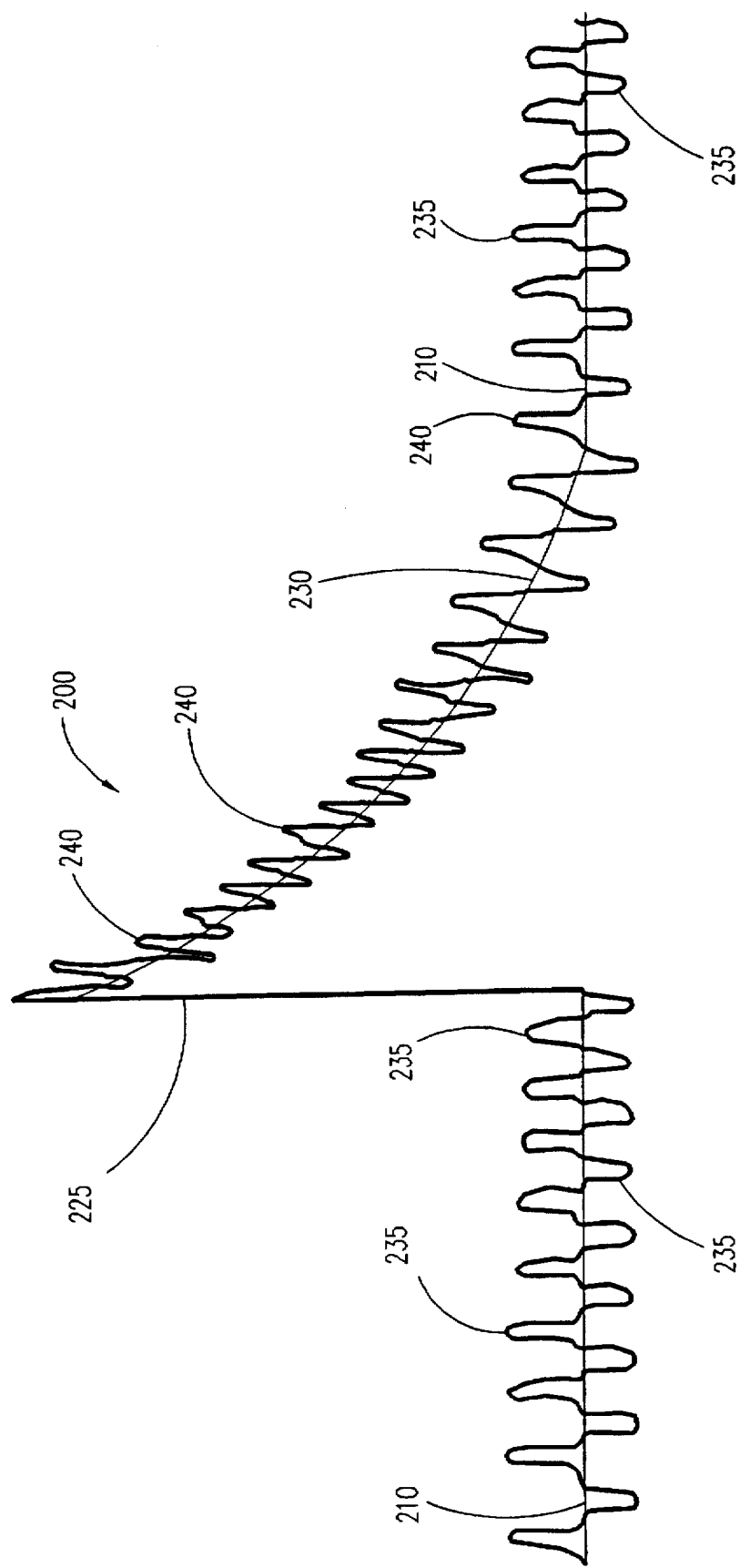
FIG. 2 is a graph showing a thermal asperity signal and the data signal read back from a track.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321 where the head 321 incorporates the MR sensor of the present invention. As the disks rotate, slider 313 is moved radially in and out over disk surface 322 so that heads 321 may access different portions of the disk where desired data is recorded. Each slider 313 is attached to an actuator arm 319 by means of a suspension 315. The suspension 315 provides a slight spring force which biases slider 313 against the disk surface 322. Each actuator arm 319 is attached to an actuator means 327. The actuator means as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by means of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4A:
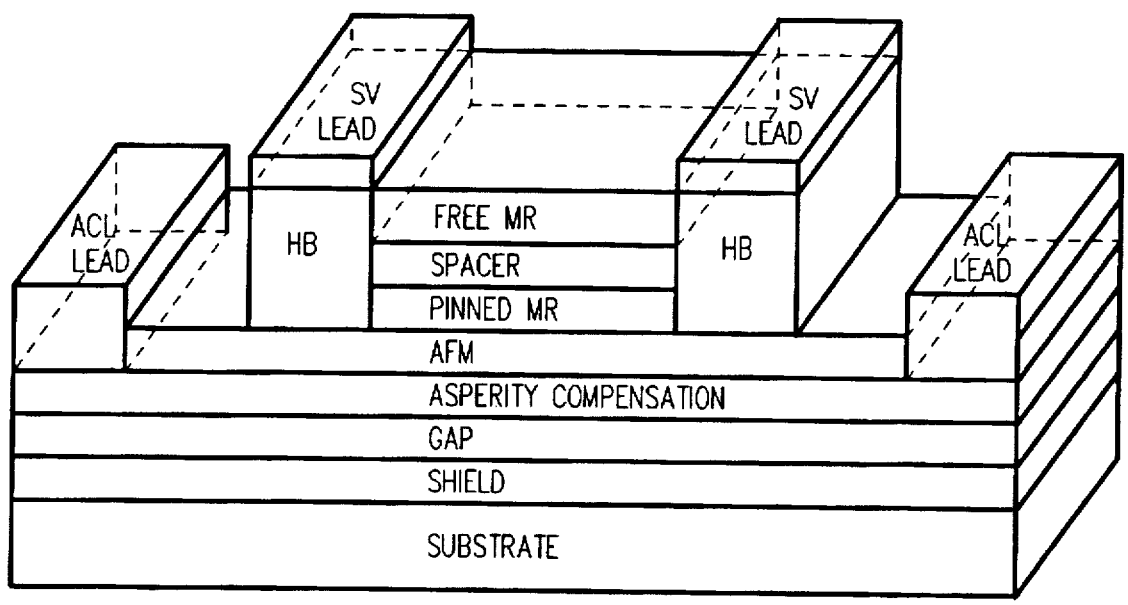
FIGS. 4A and 4B are perspective and air bearing surface views, not to scale, of the AMR sensor of the preferred embodiment of the present invention.
Figure 4B:
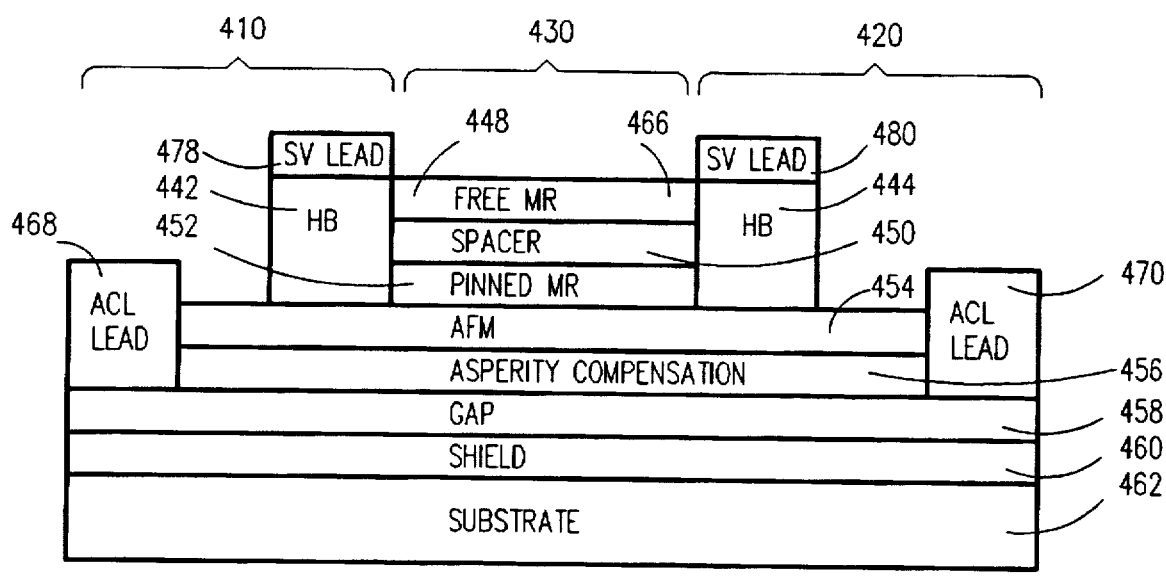

Now referring to FIGS. 4A and 4B, there is shown a perspective view and an air bearing surface view, not to scale, of an AMR sensor 400 of the preferred embodiment of the present invention. AMR sensor 400 comprises passive end regions 410 and 420 separated by a central active region 430. A magnetic shield layer 460 and a gap layer 458 are preferably, although not necessary, formed on a suitable substrate 462. Shield layer 460 provides magnetic insulation for the MR sensor 400 and is typically made of NiFe or sendust (TM). Gap layer 458 provides electrical insulation for the MR sensor 400 and is generally made of $Al_2O_3$ or $SiO_2$. After forming gap layer 458, an antiferromagnetic layer 456, a soft adjacent layer (SAL) 454 and an insulator layer 452 are also formed on the gap layer. Antiferromagnetic (AFM) layer 456 is used to fix the magnetization of the SAL 454 in a fixed direction. AFM layer 456 is preferably made of NiO to ensure that the thermal coefficient of the AFM 456 does not effect the shape of the thermal asperity signal detected by the SAL 454. Alternatively, AFM layer 456 may be made of FeMn or NiMn. The SAL 454 is preferably made of NiFe and in the preferred embodiment of the present invention, the SAL 454 magnetization is fixed to be perpendicular to the air bearing surface 466 (ABS refers to the surface of the magnetic head, including the MR sensor, adjacent the magnetic disk surface). The MR sensor 400 further comprises an MR layer 436 and preferably a seed layer 446 both of which are formed in the central region 430 over the insulator 452. The seed layer 446 is used to enhance the magnetic characteristic of the MR layer and is made of tantalum. The MR layer 436 with its magnetization free to rotate under the presence of an external field is generally made of soft ferromagnetic material, such as NiFe or NiFe/Co and preferably made of NiFe. Magnetization of the MR layer 436 is generally set to be parallel to the air bearing surface in the absence of an external field.

Hard bias layers 442 and 444 which are formed in the end regions 410 and 420, respectively, provide a longitudinal bias field to the MR layer 436 to ensure a single magnetic domain state for the MR layer 436. Hard bias layers 442 and 444 are preferably made of CoPtCr although they may also be made of CoPtCrTa or $CoPtCrSiO_2$. Hard bias layers 442 and 444 further form contiguous junctions with the MR layer 436.

Figure 5:
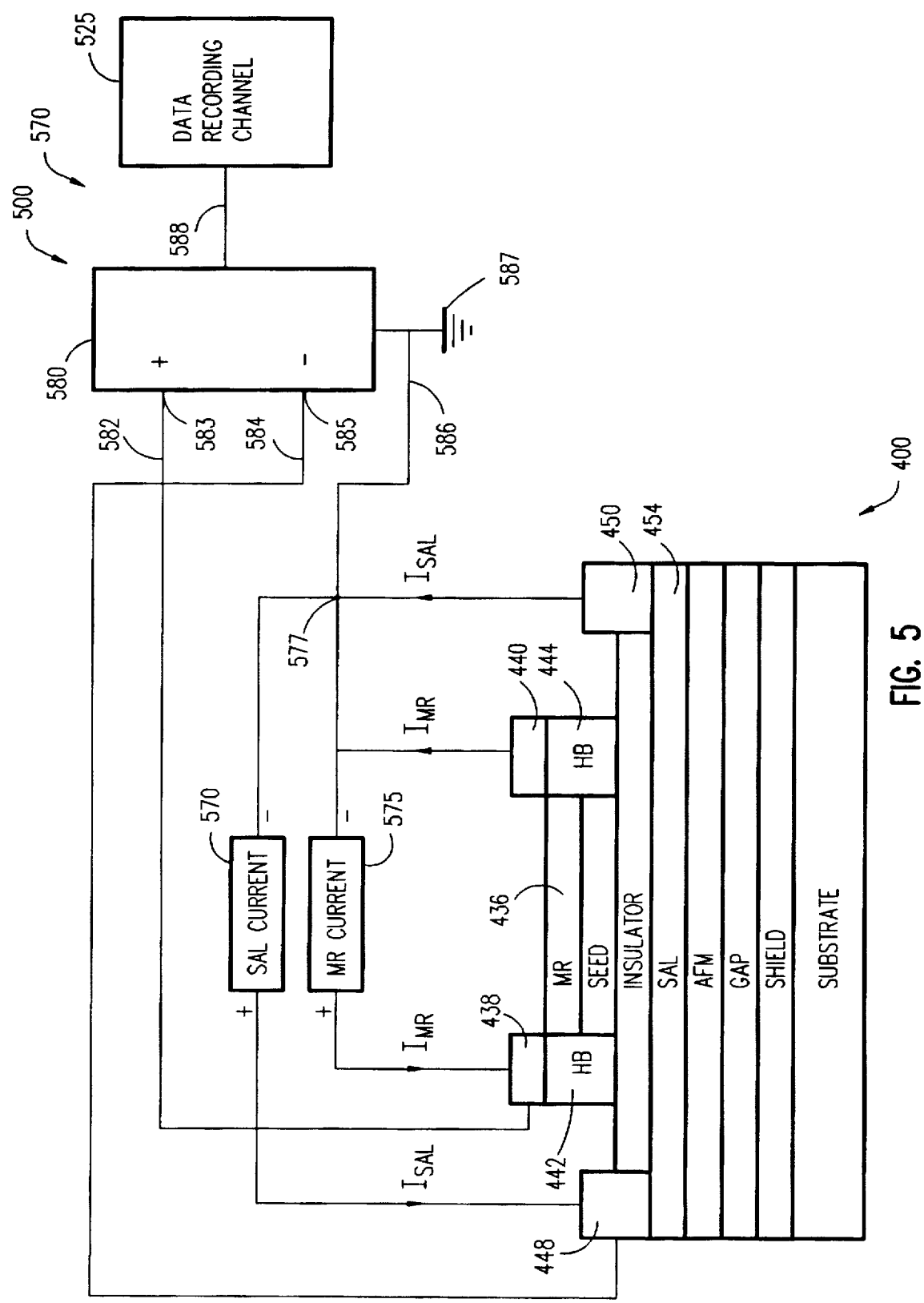
FIG. 5 is a schematic diagram illustrating a thermal asperity reduction method and means according to the preferred embodiment of the present invention.

MR sensor 400 further comprises four electrical leads. Leads 448 and 450 formed in the end regions 410 and 420, respectively, are referred to as the first and second SAL leads and provide electrical connection between the SAL 454 and the SAL current source 570 (FIG. 5). The SAL current source 570 provides current to the SAL 454 (referred to as the SAL current) to establish the DC base (bias) voltage across the SAL 454. Leads 438 and 440 formed in the end regions 410 and 420, respectively, are referred to as the first and second MR leads and provide electrical connection between the MR layer 436 and the MR current source 575 (FIG. 5). MR current source 575 provides the necessary sense current to the MR layer 436 to establish the DC base (bias) voltage across the MR layer 436.

Note that in the MR sensor 400 of the present invention, the SAL 454 is electrically insulated from the MR layer 436 and the hard bias layers 442 and 444. The complete electrical insulation ensures that the current flowing in the MR layer 436, provided by the MR current source 575, is not shunted in anyway by the SAL 454. The electrical insulation between the SAL 454 and the MR layer 436 and the hard bias layers 444 and 442 is achieved by a layer of insulating material 452 which is disposed between the SAL 454 and the MR layer 436 and the hard bias layers 444 and 442. Insulator 452 is typically made of $Al_2O_3$ or $SiO_2$.

Now referring to FIG. 5, there is shown a schematic diagram of a thermal asperity reduction circuitry 500 according to the preferred embodiment of the present invention. Circuitry 500 comprises MR sensor 400 having first and second MR leads 438 and 440 and first and second SAL leads 448 and 450, an MR current source 575, a SAL current source 570 and a differential circuit 580. The differential circuit 580 includes a first and second input terminals 583 and 585, an output terminal 588 and a ground (reference) terminal 587.

Now, referring back to FIG. 5, MR leads 438 and 440 are connected to the MR current source 575 which provides the necessary sense current to the MR layer 436 to establish the DC bias voltage across the MR layer 436. SAL leads 448 and 450 are connected to the SAL current source 570 to provide the necessary current to the SAL 454 such that under the bias condition (no external field present), the product of the MR layer 436 resistance times the current flowing in the MR layer 436 (the voltage drop across the MR layer 436) is equal to the product of the SAL 454 resistance times the current flowing in the SAL 454 (the voltage drop across the SAL).

In the preferred embodiment of the present invention,

MR strip height=1 µm;

MR layer width=2 µm;

MR layer thickness=150 Å;

ρ of the MR layer=25 µΩ cm; and

MR resistance=32 Ω

Furthermore, in the preferred embodiment of the present invention,

SAL height=1 µm;

SAL layer width=4 µm;

SAL thickness=100 Å;

ρ of the SAL layer=25 µΩ cm; and

SAL resistance=100 Ω.

In the preferred embodiment of the present invention, MR sense current is 10 mA which means the SAL current will be set at 3.2 mA to ensure that under the DC bias condition:

$$R_{MR}*I_{MR}=R_{SAL}*I_{SAL}.$$

Referring back to FIG. 5, first MR lead 438 is also connected, via the wire 582, to the first input terminal 583 of the differential circuit 580 and the first SAL lead 448 is connected, via the wire 584, to the second input terminal 585 of the differential circuit 580. Leads 440 and 450 are preferably connected to a common wiring pad 577. The common pad 577 in turn is connected, via wire 586, to the ground 587 of the differential circuit 580. The output terminal 588 of the differential circuit 580 is then connected to the data recording channel 525 for further processing according to the description of FIG. 3. The recording channel 525 and the differential circuit 580 together are referred to as the recording system 590. Differential circuit 580 is preferably a silicon-based high-speed differential amplifier integrated into the same silicon chip that the data recording channel 525 is integrated into. Differential circuit 580 further has a differential gain such that the output voltage at node 588 due to the difference between the voltages applied to its first and second input terminals 583 and 585 can be expressed in terms of:

$$V_{588}=A*(V_{583}-V_{585})$$

where A is the differential gain of the differential circuit 580.

Figure 6A:
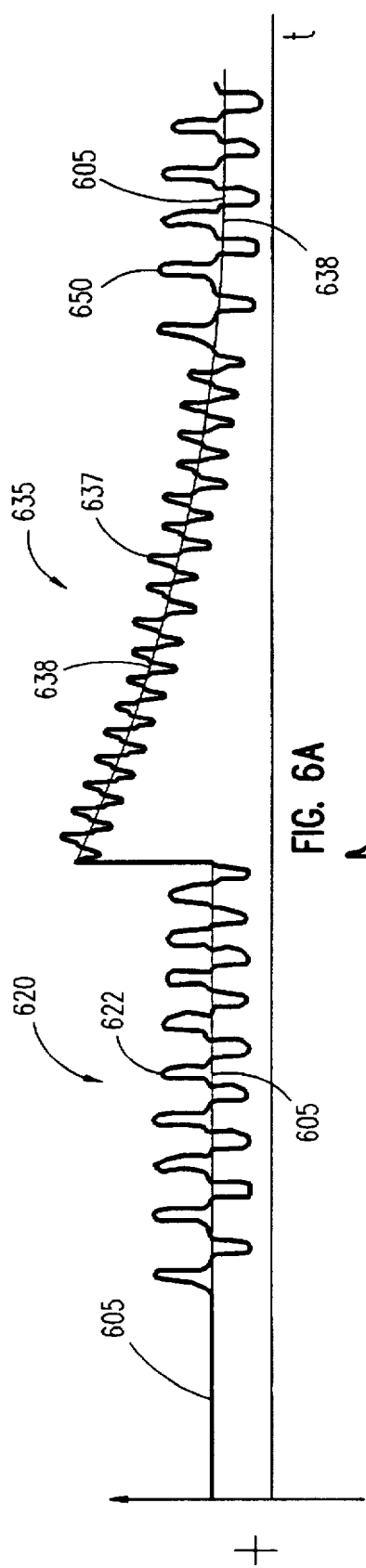
FIGS. 6A, 6B and 6C are graphs illustrating the signals at the input terminals and the output terminal of the differential circuit in the preferred embodiment of the present invention in the absence of thermal asperity and data signal, in the absence of thermal asperity and the presence of data signal and in the presence of thermal asperity and data signal.
Figure 6B:
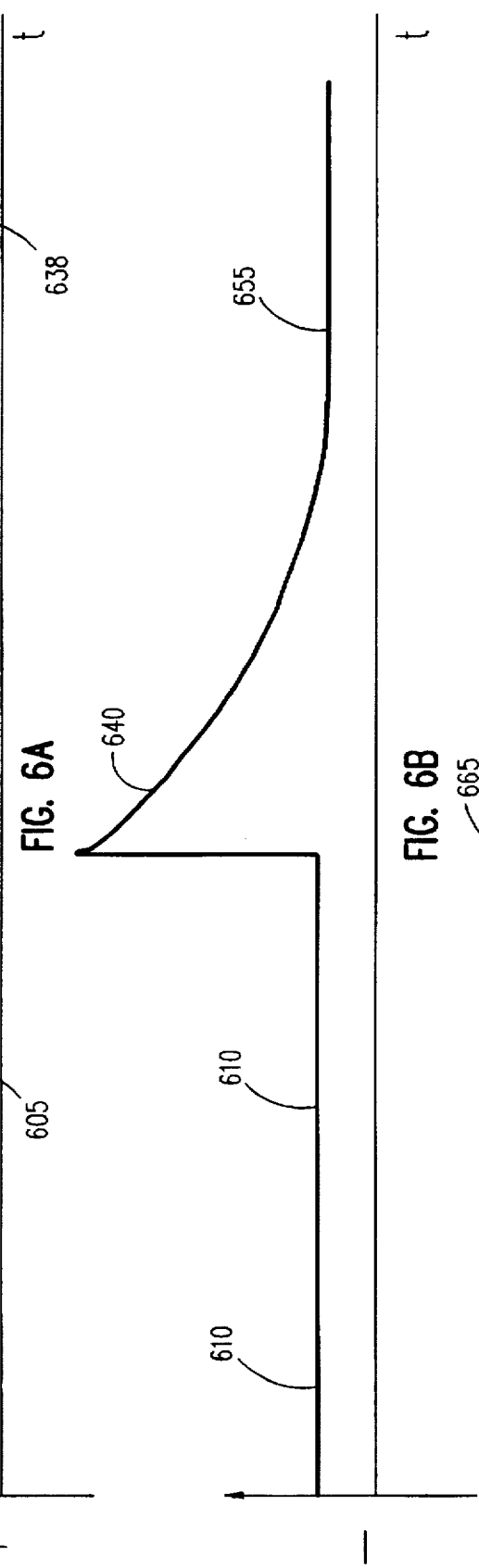
Figure 6C:
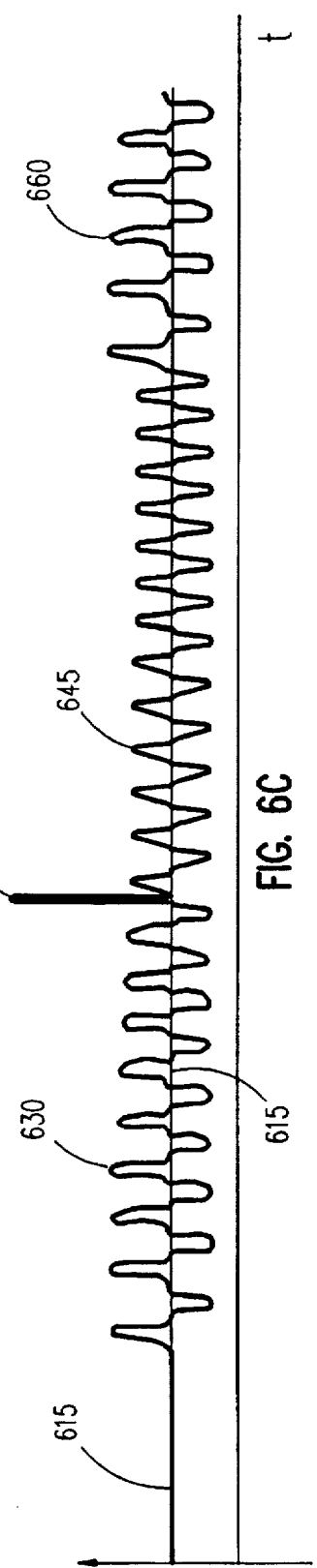

Now referring to FIGS. 6A, 6B, and 6C, there are shown the voltage signals present at the first input terminal 583, the second input terminal 585 and the output terminal 588 of the differential amplifier 580 under DC bias condition, in the presence of data fields from a magnetic disk, and in the presence of a thermal asperity and data fields from the magnetic disk, respectively. Now referring to FIGS. 5 and 6A–6C, under the DC bias condition (no external field is present) the voltage at the first terminal 583 is a DC voltage 605 which is $R_{MR}* I_{MR}$ (the voltage drop across the MR layer 436), the voltage at the second terminal 585 is a DC voltage 610 which is $R_{SAL}*I_{SAL}$ (the voltage drop across the SAL 454), and the voltage at the output terminal 588 is a DC voltage 615.

In the presence of a field, such as a data field from a magnetic disk, the voltage across the MR layer 436 changes because of the change in the resistance of the MR layer 436. The voltage developed across the MR layer 436 as a result of the change in the resistance of the MR layer 436 in the presence of a data field is represented in a form of an AC signal. Consequently, the voltage signal at the first input terminal 583 which is connected to the first MR lead 438 is voltage 620 which has an AC component 622 and a DC component 605. The AC component, as mentioned above, is due to the change in the resistance of the MR layer 436 in the presence of the field from the disk and is:

$$I_{MR}*\Delta R_{MR}$$

and the DC component, as described above, is:

$$I_{MR}*R_{MR}$$

such that:

$$V_{620}=I_{MR}*\Delta R_{MR}+I_{MR}*R_{MR}$$

Referring back to FIG. 5 and FIGS. 6A–C, in the presence of a field from the disk, the voltage across the SAL 454 does not change because SAL 454 is insulated from the MR layer 436 and the hard bias layers 442 and 444 and its magnetization is fixed by the AFM 456. Consequently, the voltage at the second input terminal 585 remains the same as the voltage under the DC bias condition, that is, $$V_{610}=I_{SAL}*R_{SAL}.$$

In the presence of a field from the disk, the voltage at the output terminal 588 will be equal to the difference between the voltage signals at the first and second input terminals 583 and 584 times the differential gain of the circuit 580 as shown below:

$$V_{588}=A*(V_{583}-V_{585})$$

$$V_{630}=A*(V_{620}-V_{610})$$

$$V_{630}=A*(I_{MR}*\Delta R_{MR}+I_{MR}*R_{MR}-I_{SAL}*R_{SAL})$$

Since the resistance and the current flowing in the SAL 454 are chosen such that $I_{MR}*R_{MR}=I_{SAL}*R_{SAL}$, the contribution from the above two signals cancel each other and:

$$V_{630}=A*(I_{MR}*\Delta R_{MR})$$

Now, assume that a thermal asperity phenomenon takes place while reading data from a track of a disk causing the MR sensor 400 temperature to increase. Under such condition, the voltage at the first input terminal 583 would be a voltage 635 which has an AC component 637 and a DC component 638. The AC component is due to the change in the resistance of the MR layer 436 in the presence of the field from the disk and is:

$$I_{MR}*\Delta R_{MR}.$$

The DC component 638, which is represented by a sudden shift in the DC voltage followed by an exponential decay in the shifted DC voltage, is:

$$I_{MR}*R_{MR}$$

such that:

$$V_{635}=I_{MR}*\Delta R_{MR}+I_{MR}*R_{MR}$$

In the presence of the thermal asperity, the bias voltage across the SAL 454 also changes because of the sudden change of temperature causing the resistance of the SAL 454 changes. The change in the bias voltage (thermal asperity signal) is represented by a sudden shift in the DC voltage followed by an exponential decay of the shifted voltage. Consequently, the voltage at the second input terminal 585 is:

$$V_{640}=I_{SAL}*R_{SAL}$$

Now, assume that a thermal asperity phenomenon takes place while reading data from a track of a disk. Under this condition, the voltage at the output terminal 588 will be equal to the difference between the voltage signals at the first and second input terminals 583 and 584 times the differential gain of the circuit 580 as shown below:

$$V_{588}=A*(V_{583}-V_{585})$$

$$V_{645}=A*(V_{635}-V_{640})$$

$$V_{645}=A*(I_{MR}*\Delta R_{MR}+I_{MR}*R_{MR}-I_{SAL}*R_{SAL})$$

Since the resistance and the current flowing in the SAL 454 are chosen such that $I_{MR}*R_{MR}=I_{SAL}*R_{SAL}$, and since the MR layer 436 material and the SAL 454 material are chosen to have the same thermal coefficient, the thermal asperity signal developed across the MR layer 436 and the SAL layer 454 are substantially of the same shape, magnitude, and phase. Therefore, the terms $I_{MR}*R_{MR}$ and $I_{SAL}*R_{SAL}$ in the above equation cancel each other which means:

$$V_{645}=A*(I_{MR}*\Delta R_{MR})$$

Note that, in the actual implementation a narrow signal spike 665 is usually present at the output terminal 588 at the onset of the sudden shift in the DC voltage due to finite physical mismatches present between: (1) the resistance of the MR layer 436 and the SAL 454, (2) resistance of the MR and SAL leads, (3) SAL current source 570 and the MR current source 575, and (4) internal mismatches of the differential circuit. However, this spike is generally only a few bits long which does not cause loss of data.

Figure 7:
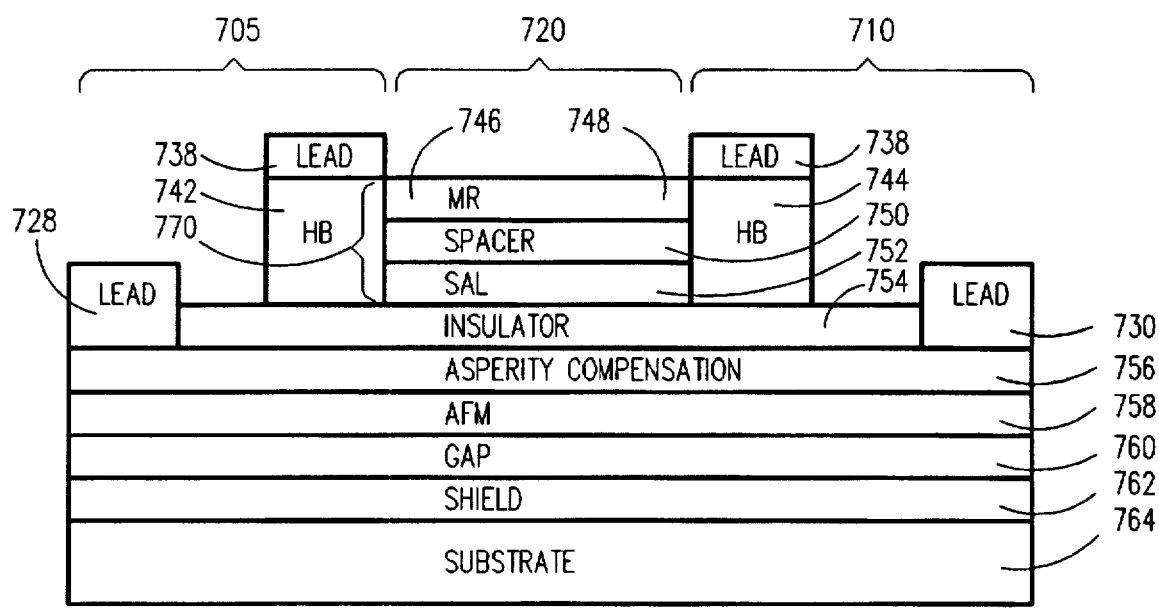
FIG. 7 is an air bearing surface view, not to scale, of an alternative embodiment of the AMR sensor of the present invention.

Referring now to FIG. 7, there is shown an air bearing surface view, not to scale, of an AMR sensor 700 of an alternative embodiment of the present invention. AMR sensor 700 comprises passive end regions 705 and 710 separated by a central active region 720. A magnetic shield layer 762 and a gap layer 760 are generally, although not necessarily, formed on a suitable substrate 764. Shield layer 762 provides magnetic insulation for the MR sensor 700 and is typically made of NiFe or sendust (TM). Gap layer 760 provides electrical insulation for the MR sensor 700 and is generally made of $Al_2O_3$ or $SiO_2$. After forming gap layer 760, an antiferromagnetic layer 758, an asperity compensation layer (ACL) 756 and an insulator layer 754 are generally formed on the gap layer. Antiferromagnetic (AFM) layer 758 is used to fix the magnetization of the ACL 756 in a fixed direction. AFM layer 758 is preferably made of NiO to ensure that the thermal coefficient of the AFM layer 758 does not effect the shape of the thermal asperity signal detected by the ACL 756. Alternatively, AFM layer 758 may be made of FeMn or NiMn. The asperity compensation layer (ACL) 756 is preferably made of NiFe and its magnetization is fixed to be perpendicular to the air bearing surface 746. Alternatively, the ACL 756 may be made of non-magnetic electrically conducting material having the same or substantially similar thermal coefficient as the MR layer 748 such as copper or tantalum. It should be noted that if ACL 756 is made of non-magnetic material, then there would be no need for AFM layer 758. The MR sensor 700 further comprises an MR layer 748 formed in the central region 720. The MR layer 748 is separated from a soft adjacent layer (SAL) 752 by a non-magnetic electrically conducting spacer 750. The SAL 752, formed in the central region 720, provides a transverse bias field to the MR layer 748. In the case that ACL 756 is made of magnetic material, then ACL's magnetization and the SAL 752 magnetization has to be in the same direction. The MR layer 748 with its magnetization free to rotate under the presence of an external field is generally made of soft ferromagnetic material, such as NiFe or NiFe/Co and preferably made of NiFe. Magnetization of the MR layer 748 is generally set to be parallel to the air bearing surface 746 in the absence of an external field. MR layer 748, spacer layer 750 and the SAL 754 are referred to as MR element 770.

Hard bias layers 742 and 744 which are formed in the end regions 705 and 710, respectively, provide a longitudinal bias field to the MR layer 748 to ensure a single magnetic domain state for the MR layer 748. Hard bias layers 742 and 744 are preferably made of CoPtCr although they may also be made of CoPtCrTa or CoPtCrSiO$_2$. Hard bias layers 742 and 744 further form contiguous junctions with the MR layer 748.

MR sensor 700 further comprises four electrical leads. Leads 728 and 730 formed in the end regions 705 and 710, respectively, are referred to as the first and second ACL leads and provide electrical connection between the ACL 756 and an ACL current source (not shown). The ACL current source provides current to the ACL 756 (referred to as the ACL current) to establish the DC base (bias) voltage across the ACL 756. Leads 738 and 740 formed in the end regions 705 and 710, respectively, are referred to as the first and second MR leads and provide electrical connection between the MR layer 748 and an MR current source (not shown). MR current source provides the necessary sense current to the MR layer 748 to establish the DC base (bias) voltage across the MR layer 748.

Note that in the MR sensor 700 of the present invention, the ACL 756 is electrically insulated from the MR element 770 and the hard bias layers 742 and 744. The complete electrical insulation ensures that the current flowing in the MR element 770, provided by the MR current source, is not shunted in any way by the ACL 756. The electrical insulation between the ACL 756 and the MR element 770 and the hard bias layers 742 and 744 is achieved by a layer of insulating material 754 which is disposed between the ACL 756 and the MR element 770 and the hard bias layers 742 and 744. Insulator 754 is typically made of Al$_2$O$_3$ or SiO$_2$.

In the alternative embodiment of the present invention, MR sensor 400 in FIG. 5 is replaced by the alternative MR sensor 700 to provide for thermal asperity detection and reduction utilizing the thermal asperity reduction circuitry 500.

While the present invention has been particularly shown and described with reference to the preferred embodiment thereof, nevertheless, it will be understood by those skilled in the art that various modifications may be made therein without departing from the spirit, scope, and teaching of the present invention. For example, although the preferred embodiment of the present invention was described in terms of an MR sensor having four leads where two of the leads were shorted together, the invention is equally applicable to an MR sensor having only three leads where one of the leads is the common lead (ground lead) between the MR layer and the SAL.

Accordingly, it is to be understood that the invention disclosed herein is not to be limited by the illustrated embodiment, but only by the scope of the appended claims.

We claim:

1. A magnetoresistive (MR) sensor, comprising:

an MR element, said MR element including an MR layer, a spacer, and a soft adjacent layer (SAL), said MR layer separated from said SAL by said spacer;

first and second hard bias layers separated from each other by said MR element, said first and second hard bias layers forming contiguous junction with said MR element;

an electrical insulator;

an asperity compensation layer (ACL) separated from said MR element and said hard bias layers by said electrical insulator;

first and second MR leads disposed over said first and second hard bias layers for providing sense current to said MR element; and first and second ACL leads disposed over said ACL for providing current to said ACL.

2. An MR sensor as recited in claim 1 wherein said ACL comprises NiFe.

3. An MR sensor according to claim 2, further including an antiferromagnetic (AFM) layer for pinning the magnetization of said ACL, said ACL being disposed over said AFM layer.

4. An MR sensor as recited in claim 1 wherein said MR layer is selected from a group of material consisting of NiFe and NiFe/Co.

5. An MR sensor as recited in claim 1 wherein said ACL is selected from a group of material consisting of copper and tantalum.

6. An MR sensor as recited in claim 3 wherein said AFM layer is selected from a group of material comprising FeMn, NiMn and NiO.

7. An MR sensor as recited in claim 1 wherein said first and second hard bias layers are selected from a group of material comprising CoPtCr, CoPtCrTa, and CoPtCrSiO$_2$.

8. A magnetic storage system, comprising:

a magnetic storage medium for recording data;

a magnetoresistive (MR) sensor for reading information from said magnetic storage medium, said MR sensor comprising:

an MR element, said MR element including an MR layer, an spacer, and a soft adjacent layer (SAL), said MR layer separated from said SAL by said spacer;

first and second hard bias layers separated from each other by said MR element, said first and second hard bias layers forming contiguous junction with said MR element;

an electrical insulator;

an asperity compensation layer (ACL) separated from said MR element and said hard bias layers by said electrical insulator;

first and second MR leads disposed over said first and second hard bias layers for providing sense current to said MR element; and first and second ACL leads disposed over said ACL for providing current to said ACL; and a recording channel coupled to said MR sensor for detecting resistance changes in said MR sensing element responsive to applied magnetic fields representative of data recorded in said magnetic storage medium.

9. An MR sensor as recited in claim 8 wherein said ACL comprises NiFe.

10. A magnetic storage system according to claim 9, further including an antiferromagnetic (AFM) layer for pinning the magnetization of said ACL, said ACL being disposed over said AFM layer.

11. A magnetic storage system according to claim 8, wherein said MR layer is selected from a group of material consisting of NiFe and NiFe/Co.

12. A magnetic storage system according to claim 8, wherein said ACL is selected from a group of material consisting of copper and tantalum.

13. A magnetic storage system according to claim 8, wherein said AFM layer is selected from a group of material comprising FeMn, NiMn and NiO.

14. A magnetic storage system according to claim 8, wherein said first and second hard bias layers are selected from a group of material comprising CoPtCr, CoPtCrTa, and CoPtCrSiO$_2$.

15. A magnetic storage system according to claim 8, wherein said recording channel further comprises a differential circuit having a first and second input terminals connected to the first MR lead and the first ACL lead, respectively, for detecting resistance changes in said MR sensing element and said ACL responsive to a thermal asperity phenomena during reading data in said magnetic storage medium.

\* \* \* \* \*